United States Patent [19]
Kawashima et al.

[11] Patent Number: 6,025,436
[45] Date of Patent: Feb. 15, 2000

[54] THERMOPLASTIC FLUORINE-CONTAINING RESIN COMPOSITION USEFUL FOR CALENDERING

[75] Inventors: Chikashi Kawashima, Scarsdale, N.Y.; Katunori Kawamura, Kawagoe; Seiiti Minegishi, Moroyama, both of Japan

[73] Assignee: Central Glass Company, Limited, Yamaguchi, Japan

[21] Appl. No.: 08/861,711

[22] Filed: May 23, 1997

Related U.S. Application Data

[62] Division of application No. 08/634,018, Apr. 17, 1996, abandoned.

[30] Foreign Application Priority Data

Apr. 19, 1995 [JP] Japan ..................................... 7-093277

[51] Int. Cl.$^7$ ............................. C08L 27/12; C08L 27/16; C08L 51/04; B29C 43/24
[52] U.S. Cl. ............................. 525/72; 525/199; 264/175
[58] Field of Search .............................. 525/72; 264/175

[56] References Cited

U.S. PATENT DOCUMENTS

| | | | |
|---|---|---|---|
| 3,484,503 | 12/1969 | Magner et al. . | |
| 3,769,371 | 10/1973 | Nersasian | 525/199 |
| 4,094,949 | 6/1978 | Yokokawa | 525/199 |
| 4,370,389 | 1/1983 | Ogura | 525/314 |
| 4,530,970 | 7/1985 | Morozumi | 525/199 |
| 4,589,804 | 5/1986 | Paeglis | 405/270 |
| 4,748,204 | 5/1988 | Kawashima | 525/72 |
| 5,006,594 | 4/1991 | Rees | 525/199 |

FOREIGN PATENT DOCUMENTS

| | | | |
|---|---|---|---|
| 0 310 966 | 4/1989 | European Pat. Off. . | |
| 0 439 734 | 8/1991 | European Pat. Off. . | |
| 58-4728 | 1/1983 | Japan . | |
| 62-34324 | 7/1987 | Japan . | |
| 305844 | 12/1990 | Japan | 525/199 |
| 2 180 544 | 1/1987 | United Kingdom . | |

OTHER PUBLICATIONS

Japanese Patent Abstract of J53003495.
Elden "Calendering of Plastics" 1971 pp. 19–20.

*Primary Examiner*—David Buttner
*Attorney, Agent, or Firm*—Evenson, McKeown, Edwards & Lenahan P.L.L.C.

[57] ABSTRACT

The invention provides a thermoplastic fluorine-containing resin composition intended to be passed between at least two rollers of a calender to be thinned into a sheet or film. This composition includes: 100 parts by weight of a mixture containing 10–90 wt % of a fluorine-containing elastomeric polymer having a glass transition temperature below room temperature and 90–10 wt % of a fluorine-containing crystalline resin having a melting point not higher than 300° C.; and 0.05–2.0 parts by weight of an agent for releasing the composition from the at least two rollers. The composition has a good melt characteristic and a good elasticity for calendering of the composition, and a good releasibility from a calender roller in calendering of the composition.

11 Claims, No Drawings

THERMOPLASTIC FLUORINE-CONTAINING RESIN COMPOSITION USEFUL FOR CALENDERING

This is a divisional application of Ser. No. 08/634,018, filed on Apr. 17, 1996, now abandoned.

BACKGROUND OF THE INVENTION

The present invention relates Lo a thermoplastic fluorine-containing resin composition useful for calendering in which the composition is thinned into a sheet or film.

Fluororesins are widely used in the form of sheet, film and laminate in various fields by reason of their characteristic properties such as good heat resistance, good chemical resistance and good weather resistance. Thermoplastic fluororesins in the form of sheet and film are employed in various uses by reason of their heat melt characteristics. Such thermoplastic fluororesins are produced in the form of sheet and film, mainly by extrusion. As well as extrusion, calendering is known as a method for continuously producing materials in the form of sheet or film. In calendering, material is melted by and passed between heated rollers to be thinned into a sheet or film. The thickness of the thinned product is adjusted by changing the space between the rollers. In calendering, productivity per unit time and yield are respectively high. Therefore, calendering is widely used for producing rubber, vinyl chloride resin and the like in the form of sheet or film. In contrast, calendering is not used for producing thermoplastic fluororesins in the form of sheet or film. In general, it is necessary that resin used in calendering has an elasticity as that of rubber and is easily removed from a calender roller and sufficiently high is thermoplasticity to be rolled by external force. In calendering, resin is heated by a large shear force from two rollers. Thus, when a resin such as polystyrene or polyethylene is calendered, this resin is drastically lowered in viscosity by the heating. With this, adhesion of the resin to the rollers substantially increases, and thus it becomes difficult to remove the resin in the form of sheet or film from the rollers. Thus, such resin is not suitable for calendering.

Calendering is a useful method for producing a composite film material, too. This composite material is produced at first by calendering a material into a film, then by placing this film on a cloth (e.g., polyester cloth or glass cloth) coated with an adhesive, and then by adding a pressure to bond together the film and the cloth. It is known to use vinyl chloride resin as a material of the film.

Conventional thermoplastic fluororesins are generally high in crystallinity, and thus many of them decrease drastically in melt viscosity at temperatures at or higher than their melting points. Furthermore, they do not have a sufficient elasticity to be removed from calender rollers. Therefore, conventional thermoplastic fluororesins are not suitable for calendering. In contrast, fluorine-containing elastomeric polymer which is called fluororubber is a material usable in calendering as well as other common rubbers. However, fluorine-containing elastomeric polymer itself does not have a particular melting point, and is relatively high in melt viscosity when heated as compared with thermoplastic resins. Therefore, the calendered elastomeric polymer in the form of sheet or film does not have a good melt characteristic.

SUMMARY OF THE INVENTION

It is an object of the present invention to provide a thermoplastic fluorine-containing resin composition which has a good melt characteristic and a good elasticity for calendering of the composition, and a good releasibility from a calender roller in calendering of the composition.

According to the present invention, there is provided a thermoplastic fluorine-containing resin composition intended to be passed between at least two rollers of a calender to be thinned into a sheet or film, said composition comprising:

100 parts by weight of a mixture containing 10–90 wt % of a fluorine-containing elastomeric polymer having a glass transition temperature below room temperature and 90–10 wt % of a fluorine-containing crystalline resin having a melting point not higher than 300° C.; and 0.05–2.0 parts by weight of an agent for releasing said composition from said at least two rollers.

The inventors have unexpectedly found that a thermoplastic fluorine-containing resin composition according to the invention has a good melt characteristic and a good elasticity for calendering of the composition, and a good releasibility from a calender roller in calendering of the composition.

DESCRIPTION OF THE PREFERRED EMBODIMENTS

In the following, a thermoplastic fluorine-containing resin composition according to the present invention will be described in detail.

In calendering of the composition, when the composition is passed through a void space between the heated two rollers, the composition receives a shear force and is melted. The heating temperature of the rollers is the most preferably 10° C. higher than the melting point of the fluorine-containing crystalline resin of the composition. If this heating temperature is lower than the most preferable temperature by at least a certain degree, it is necessary to melt the composition by heat generated by the shear force added thereto. With this, there may be provided adverse effects such as that the calendering takes too much time, and that the torque to make the rollers turn around becomes too large. If the heating temperature is too high, the degree of adhesion of the composition to the rollers may become too high, or the composition may be deteriorated by heat.

In the invention, it is preferable that the composition has a melt viscosity within a range from $1 \times 10^4$ to $8 \times 10^4$ poises, in a melt-viscosity measurement at a shear rate of $10^2$ cm$^{-1}$ at a temperature which is higher than melting point of the fluorine-containing crystalline resin by 10–40° C. With this, a good calendering of the composition can be achieved. If it is less than $1 \times 10^4$ poises, the fluidity of the composition may become too high. With this, it becomes difficult to uniformly knead the composition by the roller, or the degree of adhesion of the composition to the rollers may become too high to be removed from the rollers in the form of film or sheet. If it is greater than $8 \times 10^4$ poises, the torque to make the rollers turn around may become too large, or the void space between the two rollers may have dimensions larger than the initially designed ones.

In calendering, heat is locally generated in the composition by the shear force added to the composition between the rollers. This heat changes depending on the size of space between the rollers and increases the temperature of the composition by up to about 30° C. If melt viscosity of the composition is substantially lowered by this heat to an extent of less than $1 \times 10^4$ poises in the above-mentioned melt-viscosity measurement, it may become difficult to conduct calendering. It is preferable that melt viscosity of the composition gradually changes within a temperature range having lower and upper limits which are higher than melting point of the fluorine-containing crystalline resin by 10° and by 40°, respectively.

Even if a composition according to the invention has the above-mentioned viscosity, the composition which is low in molecular weight adheres to metal rollers in the calendering. Therefore, it is essential in the invention to use an agent for releasing the composition from the rollers, to get a sufficiently high calendering rate. Hereinafter, this will be referred to as the releasing agent. It is necessary to increase the amount of the releasing agent, if a film which is thin in thickness is required. With this, the film will have a sufficient releasability from the metal rollers.

Examples of the releasing agent are hydrocarbons such as liquid paraffin and polyethylene wax, fluorocarbons such as fluorocarbon oil, polytetrafluoroethylene (PTFE) powder and fluorine-containing resins, higher fatty acids such as stearic acid and arachidic acid, fatty acid amides such as stearyl amide and methylenebisstearamide, fatty acid esters such as hardened castor oil and ethylene glycol monostearate, alcohols such as cetyl alcohol, stearyl alcohol and polyethylene glycol, metallic soaps such as calcium stearate and barium stearate, and mixtures of these. Of these examples, it is preferable to use the fluorocarbons, in view of characteristics of a product in the form of film or sheet. It is further preferable to use a thermoplastic resin containing at least 60 wt % of fluorine and having a melting point within a range from 100 to 140° C. or to use a PTFE having a melting point of at least 320° C.

In the invention, the fluorine-containing crystalline resin has a melting point not higher than 300° C., preferably not higher than 250° C. If its melting point is higher than 300° C., the calendering temperature (i.e., the heating temperature of at least two rollers in calendering) becomes too high. With this, the metal rollers corrode by hydrogen fluoride caused by this too-high calendering temperature. Therefore, it is difficult to calender a composition containing such resin having a melting point higher than 300° C., with a common calender.

In the invention, examples of the fluorine-containing crystalline resin having a melting point not higher than 300° C. are polyvinylidene fluoride (PVDF), copolymers of vinylidene fluoride (VDF) and hexafluoropropene (HFP), ternary copolymers of VDF, HFP and tetrafluoroethylene (TFE), copolymers of VDF and TFE, copolymers of VDF and chlorotrifluoroethylene (CTFE), copolymers of VDF and hexafluoroacetone (HFA), copolymers of VDF and trifluoroethylene (TrFE), polychlorotrifluoroethylene (PCTFE), copolymers of CTFE and ethylene, copolymers of TFE and ethylene, copolymers of rim and HFP, and copolymers of TFE and perfluoroalkylvinyl ether. The fluorine-containing crystalline resin may be selected from commercial products thereof.

Examples of the fluorine-containing elastomeric polymer having a glass transition temperature below room temperature are copolymers of VDF and HFP, ternary copolymers of VDF, HFP and TFE, copolymers of VDF and CTFE, and copolymers of TFE and propylene.

In the invention, the composition may contain a polymer alloy (e.g., graft copolymer, block copolymer or polymer blend), in place of the fluorine-containing elastomeric polymer itself. This polymer alloy contains a first component which is a fluorine-containing elastomeric polymer having a glass transition temperature below room temperature. Even if the composition contains this polymer, the fluorine-containing elastomeric polymer and the fluorine-containing crystalline resin are respectively in amounts of 10–90 wt % and 90–10 wt % based on the total weight of these, and the releasing agent is in amount of 0.05–2.0 parts by weight per 100 parts by weight of the total of the fluorine-containing elastomeric polymer and the fluorine-containing crystalline resin. It is preferable that the polymer alloy further contains a second component which is the same as the fluorine-containing crystalline resin in chemical composition, or which is compatible with the fluorine-containing crystalline resin, for improving mechanical strength of a product in the form of film or sheet.

Japanese Patent Examined Publication JP-B-62-34324 discloses a graft polymer prepared by graft copolymerization of a fluorine-containing elastomeric copolymer (i.e., trunk polymer) having a glass transition temperature below room temperature with a fluorine-containing crystalline polymer. This graft polymer may be used as the above-mentioned polymer alloy. Japanese Patent Examined Publication JP-B-58-4728 discloses a method of preparing a fluorine-containing polymer having a plurality of chain segments. This polymer may also be used as the polymer alloy.

As stated above, 10–90 parts by weight of the fluorine-containing elastomeric polymer is mixed with 90–10 parts by weight of the fluorine-containing crystalline resin. The actual mixing ratio is decided, in view of requisite softness of the product, melt viscosity of the composition, and the like.

As stated above, a thermoplastic resin used as the releasing agent contains at least 60 wt % of fluorine and has a melting point within a range from 100 to 140° C. Examples of this resin are copolymers of vinylidene fluoride and hexafluoropropene, and ternary copolymers of vinylidene fluoride, hexafluoropropene and tetrafluoroethylene, If this resin contains less than 60 wt % of fluorine, this resin is well mixed with the other resins in the preparation of the composition. With this, the composition may become insufficient in releasability. If this resin has a melting point lower than 100° C., it becomes difficult to stably form a film of the releasing agent which has a sufficient thickness, on the rollers. If this resin has a melting point higher than 140° C., it becomes difficult to form a film of the releasing agent which has a uniform thickness, on the rollers. As stated above, the composition contains 0.05–2.0 parts by weight of the releasing agent. If it is less than 0.05 parts by weight, a sufficient releasability can not be obtained. If it is greater than 2 parts by weight, the composition will not receive a sufficient shear force. Therefore, the product in the form of sheet or film becomes inhomogeneous.

When a PTFE having a melting point of at least 320° C. is used as the releasing agent, it is preferable to use the PTFE powder which is prepared by an emulsion polymerization. The thus prepared PTFE is high in molecular weight. This PTFE tends to be fibrillated, when it is compressed or receives a shear force. In calendering of the composition, the PTFE as the releasing agent is fibrillated in the matrix resin and thus enlarged in surface area. With this, it functions very effectively as the releasing agent. A PTFE having a melting point lower than 320° C. is low in molecular weight. Therefore, this PTFE is not sufficiently fibrillated in calendering and thus is not so effective as the releasing agent. As stated above, the composition contains 0.05–2.0 parts by weight of the releasing agent. If the PTFE as the releasing agent is less than 0.05 parts by weight, a sufficient releasibility can not be obtained. If the PTFE is greater than 2 parts by weight, the composition will increase too much in viscosity by the effect of the network of fibrillated PTFE. With this, it becomes difficult to properly conduct calendering. As the releasing agent, the above-mentioned thermoplastic resin and the PTFE may be used separately or mixed together. It is optional to add another fluorine-free releasing agent to the above-mentioned fluorine-containing releasing agent to the extent that the product in the form of film or sheet is not damaged in surface characteristics, transparency and the like. It is further optional to mix the composition with coloring agent, antistatic agent, filler for improving mechanical strength of the composition, plasticizer for adjusting fluidity of the composition, and polymeric modifier, to the extent that the composition is not damaged in aimed characteristics.

The following examples are illustrative of the present invention, but these examples are not limitative.

EXAMPLES 1-a, 1-b and 1-c

(A) Preparation of Resin Blend Composition in the Form of Sheet

At first, a VDF-HFP copolymer, VITON A (trade name) made by Mitsui-Dupont Fluoro-Chemical Co., as the fluorine-containing elastomeric polymer was mixed with PVDF pellets, SOLEF 1010 (trade name) made by SOLVEY Co., as the fluorine-containing crystalline resin, in weight ratios shown in Table 1, to prepare a mixture in an amount of 300 g. Then, 0.2 parts by weight of a PTFE powder, TEFLON 6J (trade name) which has a melting point of 327° C. determined by differential scanning calorimetry (DSC) and is made by Mitsui-Dupont Fluoro-Chemical Co., as the releasing agent was added to 100 parts by weight (300 g) of the mixture. The thus prepared mixture was repeatedly passed through a space of 1 mm between two three-inch rollers which are made by Yasuda Seiki Co. and heated at 180° C. and have a longitudinal length of 300 mm to be thinned into a sheet. This sheet was folded and then again passed through the space to obtain a sheet having a 1 mm thickness.

(B) Melt Viscosity Determination of Resin Blend Composition

At first, a part of the sheet obtained by the step (A) was cut into pellets each having dimensions of about 3 mm. Then, melt viscosity of the pellets was determined using a capillograph made by Toyo Seiki Seisakusho Co. In the determination, a cylinder heated at 180° C. (10° C. higher than melting point of the fluorine-containing crystalline polymer) was charged with the pellets. Then, the charged cylinder was maintained at 180° C. for a sufficient time. Then, the composition was extruded by a plunger moving at a constant speed, from an orifice having a diameter of 1 mm and a length of 10 mm and being formed at a lower portion of the cylinder. Melt viscosity of the composition was calculated from a shear force during the extrusion. A melt viscosity variation curve was obtained by determining melt viscosities at various shear rates. In other words, shear rate was varied by changing the moving speed of the plunger. Then, melt viscosity at a shear rate of $10^2$ sec.$^{-1}$ was determined from the melt viscosity variation curve. The results are shown in Table 2. Similarly, melt viscosity of the pellets was determined at 210° C. (40° C. higher than melting point of the fluorine-containing crystalline polymer) in place of 180° C. The results are also shown in Table 2.

(C) Evaluation of Windability of Resin Blend Composition Round Roller

At first, about 150 g of the resin blend composition obtained by the step (A) was kept in an electric oven heated at 150° C. for about 1 hr. Then, the thus heated resin blend composition was passed through a space of 0.8 mm between two three-inch rollers heated at 180° C. After this pass, when the resin blend composition did not wind round the roller and fell on the lower part of the roller by its own weight, the resin blend composition was again passed through the space immediately after this failing. Thus, this pass was repeated until the resin blend composition winds round the roller. The number of passes until the resin blend composition winds round the roller was counted and was used as an index to the windability evaluation of the resin blend composition. The results of the number of passes are shown as windability in Table 2. Windability of the composition is defined as the degree of easiness to wind round the roller. It is considered that the number of passes must be up to 3 for conducting a practical calendering of the resin blend composition, and that, if the number of passes is at least 5, it becomes difficult to conduct the practical calendering.

(D) Evaluation of Releasibility of Resin Blend Composition from Roller

The resin blend composition obtained by the step (C), winding round the roller, was kneaded for 5 min. Then, a cut was made horizontally in the resin blend composition on the roller, with a brass spatula. Releasibility of the resin blend composition from the roller was evaluated as follows. The releasibility was judged as "a", when the resin blend composition entirely fell from the roller by its own weight by making the cut. It was judged as "b", when only a portion of the resin blend sheet which is adjacent to the cut peeled off the roller by making the cut, and then the sheet was easily entirely peeled off the roller by pulling the same by hands. It was judged as "c", when only a portion of the resin blend sheet which is adjacent to the cut peeled off the roller by making the cut, and then the sheet was entirely peeled off the roller with some difficulty by pulling the same by hands. It was judged as "d", when the resin blend sheet did not peel off the roller, but adhered to the roller, even if the cut was made. As to the evaluation of releasibility, "a" or "b" is preferable for a practical calendering of the resin blend composition. If it is "c" or "d", it becomes difficult to conduct the practical calendering. The results are shown in Table 2. The thus explained evaluation of releasibility was repeated except in that the space between two rollers was adjusted to 0.3 mm to allow the resin blend sheet to wind round the rollers. The results of this evaluation are also shown in Table 2.

Comparative Examples 1-a, 1-b and 1-c

In these comparative examples, Examples 1-a to 1-c were respectively repeated except in that the releasing agent was omitted as shown in Table 1. It is understood from Table 2 that the releasibilities of the resin blend compositions according to these comparative examples are inferior to those according to Examples 1-a to 1-c.

Comparative Examples 2-a and 2-b

In these comparative examples, Example 1-a was repeated except in that the weight ratio of the VDF-HFP copolymer to the PVDF was modified as shown in Table 1. It is understood from Table 2 that the resin blend compositions according to these comparative examples were not within the preferable range ($1 \times 10^4$–$8 \times 10^4$ poises) in melt viscosity and were substantially inferior to those according to Examples 1-a to 1-c in windability or releasibility.

EXAMPLE 2

In this example, Example 1-a was repeated except in that a first graft copolymer was used in place of a mixture of the VDF-HFP copolymer and the PVDF and that the heating temperature of the rollers was modified as shown in Table 2. The first graft copolymer was prepared by graft copolymerization of a VDF-CTFE copolymer as the fluorine-containing elastic polymer, with a PVDF as the fluorine-containing crystalline resin.

A method of preparing the first graft copolymer is as follows. At the first step, 50 kg of purified water, 100 g of potassium persulfate, 150 g of ammonium perfluorooctanoate and 100 g of t-butyl peroxyallylcarbonate were introduced into a 100-liter stainless steel autoclave, and, after exhausting the gas atmosphere of the autoclave, 12.5 kg of VDF monomer and 7.55 kg of CTFE monomer were additionally charged into the autoclave. The resultant mixture was subjected to polymerization reaction at 50° C. for 20 hr with continuous stirring. The product of the reaction had an appearance of white latex, and by a salting-out treatment it turned into a rubber-like powder. The powder was washed with water, dried in vacuum, then washed with n-hexane to completely remove unreacted residue of t-butyl peroxyallylcarbonate and again dried in vacuum. With this, 16 kg of a copolymer (i.e. the fluorine-containing elastomeric polymer) was obtained in the form of white powder.

A characteristic curve obtained by thermal analysis of the elastomer by using DSC exhibited an exothermic peak at 160–180° C. By iodimetric titration, the content of active oxygen in the copolymer was measured to be 0.042%.

At the second step, 12 kg of the thus obtained elastomer and 75 kg of R-113 (1,1,2-trichlorotrifluoroethane) were introduced into a 100-liter stainless steel autoclave. After exhausting the gas atmosphere of the autoclave, 6 kg of VDF monomer was additionally charged into the autoclave, and the resultant mixture was subjected to graft copolymerization reaction at 95° C. for 24 hr.

A first graft copolymer formed by this reaction was separated from the solvent and dried to obtain 16.6 kg of white powder. By the calculation from the yield, it was found that the first graft copolymer contains 27.7 wt % of PVDF.

EXAMPLE 3

In this example, Example 2 was repeated except in that 0.5 parts by weight of a VDF-HFP-TFE ternary copolymer was used as the releasing agent, in place of the PTFE. As this ternary copolymer, there was used THV-200P (trade name) which is made by 3M Co. and has a melting point of 120° C. determined in DSC and a fluorine content of 72.3% determined by elemental analysis.

Comparative Example 3

In this comparative example, Example 2 was repeated except in that the releasing agent was omitted.

EXAMPLE 4

In this example, Example 3 was repeated except in that the PVDF according to Example 1 was mixed with the first graft copolymer according to Example 2 such that the weight ratio of the fluorine-containing elastomeric polymer to the fluorine-containing crystalline polymer was 50:50 as shown in Table 1 and that 1.0 part by weight of the ternary copolymer according to Example 3 was used as the releasing agent.

Comparative Example 4

In this comparative example, Example 4 was repeated except in that the releasing agent was omitted.

EXAMPLE 5

In this example, Example 4 was repeated except in that the PVDF according to Example 1 and the first graft copolymer according to Example 2 were mixed together such that the weight ratio of the fluorine-containing elastomeric polymer to the fluorine-containing crystalline polymer was 25:75 as shown in Table 1, and that, as the releasing agent, 1.0 part by weight of the ternary copolymer according to Example 3 and 0.2 parts by weight of the PTFE according to Example 1 were used as shown in Table 1.

Comparative Example 5

In this comparative example, Example 5 was repeated except in that the releasing agent was omitted.

EXAMPLE 6

In this example, Example 1-a was repeated except in that a second graft copolymer was used in place of a mixture of the VDF-HFP copolymer and the PVDF and that the heating temperature of the rollers was modified as shown in Table 2. The second graft copolymer was prepared by graft copolymerization of a VDF-CTFE copolymer as the fluorine-containing elastic polymer, with an ethylene-chlorotrifluoroethylene (E-CTFE) copolymer as the fluorine-containing crystalline resin.

A method of preparing the second graft copolymer is as follows. At the first step, 150 kg of purified water, 400 g of potassium persulfate, 50 g of ammonium perfluorooctanoate, 500 g of potassium dihydrogenphosphate and 200 g of 5% t-butyl peroxyallylcarbonate diluted with R-113 were introduced into a 100-liter stainless steel autoclave, and, after exhausting the gas atmosphere of the autoclave, 15 kg of VDF monomer and 12.2 kg of CTFE monomer were additionally charged into the autoclave. The resultant mixture was subjected to polymerization reaction at 50° C. for 10 hr under a pressure from 10 to 13 kgf/cm$^2$ with continuous stirring. As the product of the reaction, 145.5 kg of a copolymer having a solid matter concentration of 16.5% was obtained in the form of white latex.

At the second step, 136.7 kg (solid matter: 22.56 kg) of the thus obtained copolymer, 45.5 kg of purified water and 50 g of ammonium perfluorooctanoate were introduced into a 300-liter stainless steel autoclave. After repeating the exhaust of the gas atmosphere of the autoclave and the replacement of the same by nitrogen, 1 liter of 5% sodium hydrogensulfite aqueous solution was added to the autoclave. Then, CTFE monomer and ethylene monomer were respectively charged three times into the autoclave in total amounts of 15.4 kg and 3.7 kg, respectively, and the resultant mixture was subjected to graft copolymerization reaction under a pressure from 3 to 12 kg/cm$^2$ at 40° C. for 16 hr. Then, the reaction product in the form of slurry was centrifuged. Then, the thus obtained precipitate was separated therefrom by filtration, and then dried at 80° C., thereby obtaining 35.7 kg of the second graft copolymer in the form of white powder. By the calculation from the yield, it was found that the second graft copolymer contains 36.8 wt % of E-CTFE copolymer.

Comparative Example 6

In this comparative example, Example 6 was repeated except in that the releasing agent was omitted.

EXAMPLES 7-a and 7-b

In these examples, Example 6 was repeated except in that an E-CTFE copolymer, HALAR 300 (trade name) made by AUSIMONT Co., was added to the second graft copolymer according to Example 6 such that the weight ratios of the fluorine-containing elastomeric polymer to the fluorine-containing crystalline polymer were respectively 50:50 and 25:75 as shown in Table 1 and that the heating temperature of the rollers was modified as shown in Table 2.

Comparative Examples 7-a and 7-b

In these comparative examples, Examples 7-a and 7-b were repeated except in that a VDF-CTFE copolymer, KEL-FELASTOMER 3700 (trade name) made by 3M Co., as the fluorine-containing polymer was used in place of the second graft copolymer such that the weight ratios of the fluorine-containing elastomeric polymer to the fluorine-containing crystalline polymer were respectively 95:5 and 5:95 as shown in Table 1. It is understood from Table 2 that melt viscosities of these comparative examples were not within the preferable range ($1 \times 10^4$–$8 \times 10^4$ poises) and that Comparative Example 7-a was substantially inferior in windability and Comparative Example 7-b was substantially inferior in releasability.

TABLE 1

| | Resin Blend Composition | | | | | | | |
|---|---|---|---|---|---|---|---|---|
| | Fluorine-containing Elastomeric Polymer | | | Fluorine-containing Crystalline Polymer | | | Releasing Agent | |
| | Type | Tg (° C.) | Amount (pts. by wt.) | Type | Tg (° C.) | Amount (pts. by wt.) | Type | Amount (pts. by wt.) |
| Ex. 1-a | VDF-HFP Copolymer | −19 | 80 | PVDF | 170 | 20 | PTFE | 0.2 |
| Ex. 1-b | VDF-HFP Copolymer | −19 | 50 | PVDF | 170 | 50 | PTFE | 0.2 |
| Ex. 1-c | VDF-HFP Copolymer | −19 | 20 | PVDF | 170 | 80 | PTFE | 0.2 |
| Com. Ex. 1-a | VDF-HFP Copolymer | −19 | PVDF | 170 | 20 | — | — | |
| Com. Ex. 1-b | VDF-HFP Copolymer | −19 | 50 | PVDF | 170 | 50 | — | — |
| Com. Ex. 1-c | VDF-HFP Copolymer | −19 | 20 | PVDF | 170 | 80 | — | — |
| Com. Ex. 2-a | VDF-HFP Copolymer | −19 | 95 | PVDF | 170 | 5 | PTFE | 0.2 |
| Com. Ex. 2-b | VDF-HFP Copolymer | −19 | 5 | PVDF | 170 | 95 | PTFE | 0.2 |
| Ex. 2 | VDF-CTFE Copolymer | −25 | 72.3 | PVDF | 165 | 27.7 | PTFE | 0.2 |
| Ex. 3 | VDF-CTFE Copolymer | −25 | 72.3 | PVDF | 165 | 27.7 | THV-200P* | 0.5 |
| Com. Ex. 3 | VDF-CTFE Copolymer | −25 | 72.3 | PVDF | 165 | 27.7 | | |
| Ex. 4 | VDF-CTFE Copolymer | −25 | 50 | PVDF | 170 | 50 | THV-200P* | 1.0 |
| Com. Ex. 4 | VDF-CTFE Copolymer | −25 | 50 | PVDF | 170 | 50 | — | — |
| Ex. 5 | VDF-CTFE Copolymer | −25 | 25 | PVDF | 170 | 75 | THV-200P* and PTFE | 1.0 and 0.2 |
| Com. Ex. 5 | VDF-CTFE Copolymer | −25 | 25 | PVDF | 170 | 75 | — | — |
| Ex. 6 | VDP-CTFE Copolymer | −25 | 63.2 | ECTFE | 220 | 36.8 | PTFE | 0.2 |
| Com. Ex. 6 | VDF-CTFE Copolymer | −25 | 63.2 | ECTFE | 220 | 36.8 | — | — |
| Ex. 7-a | VDF-CTFE Copolymer | −25 | 50 | ECTFE | 240 | 50 | PTFE | 0.2 |
| Ex. 7-b | VDF-CTFE Copolymer | −25 | 25 | ECTFE | 240 | 75 | PTFE | 0.2 |
| Com. Ex. 7-a | VDF-CTFE Copolymer | −25 | 95 | ECTFE | 240 | 5 | PTFE | 0.2 |
| Com. Ex. 7-b | VDF-CTFE Copolymer | −25 | 5 | ECTFE | 240 | 95 | PTFE | 0.2 |

* THV-200P: VDF-HFP-TFE ternary copolymer

TABLE 2

| | Melt Viscosity ($\times 10^4$ poises) | | | | Releasability | |
|---|---|---|---|---|---|---|
| | at Temp. 10° C. higher than Cryst. Resin Melting Point | at Temp. 40° C. higher than Cryst. Resin Melting Point | Roller Temp. (° C.) | Windability (No. of passes) | under 0.8 mm Space between Two Rollers | under 0.3 mm Space between Two Rollers |
| Ex. 1-a | 6.5 | 4.3 | 180 | 3 | a | b |
| Ex. 1-b | 5.0 | 3.2 | 180 | 2 | b | b |
| Ex. 1-c | 4.4 | 2.2 | 180 | 1 | b | b |
| Com. Ex. 1-a | 6.2 | 4.0 | 180 | 2 | b | c |
| Com. Ex. 1-b | 4.7 | 3.2 | 180 | 2 | b | d |
| Com. Ex. 1-c | 4.2 | 2.0 | 180 | 1 | c | d |
| Com. Ex. 2-a | 8.5 | 6.8 | 180 | 9 | a | a |
| Com. Ex. 2-b | 3.2 | 0.9 | 180 | 1 | d | d |
| Ex. 2 | 5.2 | 2.5 | 175 | 2 | b | b |
| Ex. 3 | 4.6 | 2.3 | 175 | 2 | b | b |
| Com. Ex. 3 | 4.7 | 2.4 | 175 | 1 | b | c |
| Ex. 4 | 4.8 | 2.2 | 180 | 2 | a | b |
| Com. Ex. 4 | 5.0 | 2.2 | 180 | 1 | c | d |
| Ex. 5 | 3.9 | 1.8 | 180 | 1 | b | b |
| Com. Ex. 5 | 3.5 | 1.6 | 180 | 1 | d | d |
| Ex. 6 | 3.1 | 2.0 | 230 | 2 | b | b |
| Com. Ex. 6 | 3.0 | 1.9 | 230 | 1 | c | d |
| Ex. 7-a | 3.0 | 1.8 | 250 | 2 | b | b |
| Bx. 7-b | 2.8 | 1.7 | 250 | 1 | b | b |
| Com. Ex. 7-a | 9.3 | 7.8 | 250 | 10 | a | a |
| Com. Ex. 7-b | 2.8 | 0.9 | 250 | 1 | d | d |

What is claimed is:

1. A method for calendering a thermoplastic fluorine-containing composition, said method comprising a step of passing said composition between at least two rollers heated at a roller temperature, said composition comprising:

100 parts by weight of a fluorine-containing graft copolymer containing a trunk polymer that is a fluorine-containing elastomeric polymer having a glass transition temperature below room temperature and a branch polymer that is a first fluorine-containing crystalline polymer having a melting point not higher than 300° C.; and 0.05–2.0 parts by weight of an agent for releasing said composition from said at least two rollers, said releasing agent comprising a polytetrafluoroethylene having a melting point of at least 320° C., wherein said composition has a melt viscosity within a range of from $1\times10^4$ to $8\times10^4$ poises, in a melt-viscosity measurement at a shear rate of $10^2$ cm$^{-1}$ at a temperature that is higher than a melting point of said first fluorine-containing crystalline polymer by 10–40° C., and wherein said roller temperature is higher than said melting point of said first fluorine-containing crystalline polymer, by about 10° C.

2. A method according to claim 1, wherein said fluorine-containing graft copolymer contains 10–90 wt % of said fluorine-containing elastomeric polymer and 90–10 wt % of said first fluorine-containing crystalline polymer.

3. A method according to claim 1, wherein said releasing agent further comprises a thermoplastic resin containing at least 60 wt % of fluorine and having a melting point within a range from 100 to 140° C.

4. A method according to claim 3, wherein said thermoplastic resin is one selected from the group consisting of copolymers of vinylidene fluoride and hexafluoropropene, and ternary copolymers of vinylidene fluoride, hexafluoropropene and tetrafluoroethylene.

5. A method according to claim 1, wherein said composition comprises a mixture of said fluorine-containing graft copolymer, said releasing agent, and a second fluorine-containing crystalline polymer having a chemical composition that is the same as that of said first fluorine-containing crystalline polymer, and said composition contains 10–90 wt % of said fluorine-containing elastomeric polymer and 90–10 wt % of a total of said first and second fluorine-containing crystalline polymers.

6. A method according to claim 1, wherein said polytetrafluoroethylene is prepared by an emulsion polymerization, so that said polytetrafluoroethylene is high in molecular weight.

7. A method according to claim 1, wherein said first fluorine-containing crystalline polymer is one selected from the group consisting of polyvinylidene fluoride, copolymers of vinylidene fluoride and hexafluoropropene, ternary copolymers of vinylidene fluoride, hexafluoropropene and tetrafluoroethylene, copolymers of vinylidene fluoride and tetrafluoroethylene, copolymers of vinylidene fluoride and chlorotrifluoroethylene, copolymers of vinylidene fluoride and hexafluoroacetone, copolymers of vinylidene fluoride and trifluoroethylene, polychlorotrifluoroethylene, copolymers of chlorotrifluoroethylene and ethylene, copolymers of trifluoroethylene and ethylene, copolymers of trifluoroethylene and hexafluoropropene, and copolymers of trifluoroethylene and perfluoroalkylvinyl ether.

8. A method according to claim 1, wherein said fluorine-containing elastomeric polymer is one selected from the group consisting of copolymers of vinylidene fluoride and hexafluoropropene, ternary copolymers of vinylidene fluoride, hexafluoropropene and tetrafluoroethylene, copolymers of vinylidene fluoride and chlorotrifluoroethylene, and copolymers of trifluoroethylene and propylene.

9. A method according to claim 1, wherein said trunk polymer is a copolymer of chlorotrifluoroethylene, vinylidene fluoride and a monomer containing a peroxy group, and said branch polymer is a first polyvinylidene fluoride.

10. A method according to claim 9, wherein said composition comprises a mixture of said fluorine-containing graft copolymer, said releasing agent, and a second polyvinylidene fluoride, and said composition contains 10–90 wt % of said fluorine-containing elastomeric polymer and 90–10 wt % of a total of said first and second polyvinylidene fluorides.

11. A method according to claim 1, wherein said trunk polymer is a copolymer of chlorotrifluoroethylene, vinylidene fluoride and a monomer containing a peroxy group, and said branch polymer is a copolymer of ethylene and chlorotrifluoroethylene.

* * * * *

UNITED STATES PATENT AND TRADEMARK OFFICE
CERTIFICATE OF CORRECTION

PATENT NO.   : 6,025,436
DATED        : February 15, 2000
INVENTOR(S)  : Kawashima et al.

It is certified that error appears in the above-indentified patent and that said Letters Patent is hereby corrected as shown below:

Title page, item [22]:

Change the filing date from "May 23, 1997" to --May 22, 1997.--

Signed and Sealed this

Twenty-sixth Day of December, 2000

Attest:

Q. TODD DICKINSON

*Attesting Officer*          *Director of Patents and Trademarks*